(12) United States Patent
Zhang et al.

(10) Patent No.: US 12,370,465 B2
(45) Date of Patent: Jul. 29, 2025

(54) FILTER ELEMENT, FILTER, FILTRATION SYSTEM AND CLEANING SYSTEM

(71) Applicants: Tyco Electronics (Shanghai) Co. Ltd, Shanghai (CN); Tyco Electronics (Suzhou) Ltd., Suzhou (CN)

(72) Inventors: Daiqiong (Diana) Zhang, Shanghai (CN); Dongqing (Gates) Peng, Suzhou (CN); Zhongxi Huang, Shanghai (CN)

(73) Assignees: Tyco Electronics (Shanghai) Co., Ltd., Shanghai (CN); Tyco Electronics (Suzhou) Ltd., Suzhou (CN)

( * ) Notice: Subject to any disclaimer, the term of this patent is extended or adjusted under 35 U.S.C. 154(b) by 465 days.

(21) Appl. No.: 17/851,344

(22) Filed: Jun. 28, 2022

(65) Prior Publication Data

US 2022/0410033 A1    Dec. 29, 2022

(30) Foreign Application Priority Data

Jun. 28, 2021    (CN) .......................... 202110718146.X

(51) Int. Cl.
| | | |
|---|---|---|
| *B01D 15/10* | (2006.01) | |
| *B01D 33/50* | (2006.01) | |
| *B01F 27/1143* | (2022.01) | |
| *B01F 27/921* | (2022.01) | |

(52) U.S. Cl.
CPC ............. *B01D 15/10* (2013.01); *B01D 33/50* (2013.01); *B01F 27/1143* (2022.01); *B01F 27/921* (2022.01)

(58) Field of Classification Search
None
See application file for complete search history.

(56) References Cited

U.S. PATENT DOCUMENTS

| | | | | |
|---|---|---|---|---|
| 5,851,305 A | * | 12/1998 | Yamada | C23G 5/024 134/40 |
| 2009/0056542 A1 | * | 3/2009 | Carew | B01D 29/23 366/293 |
| 2010/0300975 A1 | * | 12/2010 | Pate | B01J 20/2805 210/219 |
| 2011/0220586 A1 | * | 9/2011 | Levitt | B01D 29/6415 210/791 |

FOREIGN PATENT DOCUMENTS

| | | | | |
|---|---|---|---|---|
| KR | 200397894 Y1 | * | 10/2005 | |
| KR | 20160126958 A | * | 4/2015 | ............. B01F 27/91 |

* cited by examiner

*Primary Examiner* — Bradley R Spies
*Assistant Examiner* — Jeannie McDermott
(74) *Attorney, Agent, or Firm* — Barley Snyder

(57) ABSTRACT

A filter element includes a stirring device, a continuous adsorption carrier arranged around the stirring device, and a granular adsorption carrier filled between the continuous adsorption carrier and the stirring device. The stirring device stirs the granular adsorption carrier when filtering a liquid with the filter element.

20 Claims, 2 Drawing Sheets

FILTER ELEMENT, FILTER, FILTRATION SYSTEM AND CLEANING SYSTEM

CROSS-REFERENCE TO RELATED APPLICATION

This application claims the benefit of the filing date under 35 U.S.C. § 119(a)-(d) of Chinese Patent Application No. 202110718146.X, filed on Jun. 28, 2021.

FIELD OF THE INVENTION

The present invention relates to a filter element, a filter including the filter element, a filtration system including the filter and a cleaning system including the filtration system.

BACKGROUND

In the prior art, industrial cleaning will use a large amount of water to remove the residual metal ions and organic pollution on the surface of components (such as cleaning of electroplating component, electro-less plating component, and various electronic components). The main method of waste water recovery and treatment is to use the ordinary industrial filter element for on-line, real-time rough filtration. When the pollutants in the washing water accumulate to a higher concentration, the cleaning effect decreases, even in turn aggravating the pollution of the cleaned components. The wastewater with high accumulation of pollutants shall be replaced and collected regularly, and the wastewater shall be centrally treated (by such as drain treatment station) off-line to the discharge standard.

The existing industrial filter element has a simple structure, a single filter material and a low adsorption saturation. Generally, it uses wire wound or melt blown polypropylene resin or activated carbon, and is barely enough to filter clean domestic tap water. However, the pollutant components in the industrial cleaning water are complex, and the concentration is increasing continuously. The filter element very easily saturates and is blocked, and it cannot absorb pollutants efficiently for a long time, so that the on-line filtration effect of industrial cleaning is very small, resulting in insufficient cleanliness of components. In order to ensure the cleaning effect, water to be recycled must be frequently changed outside the line, which has high process cost and large waste discharge, endangering environmental protection. For example, heavy ion pollution will cause low insulation resistance and short circuit of electronic components, while high-precision industries such as semiconductors are almost cleaned with running water, with high wastewater discharge and great pressure on environmental protection.

The high pollution process, such as electroplating, is not only a problem of cleanliness, but also leads to the decrease of coating adhesion, the increase of porosity and even peeling. Its failure mechanism is that, before metal electroplating deposition, metal ions with high potential, such as silver ions and gold ions, are easily replaced and deposited on the surface of metal components to be plated with high potential, and the replacement layer is extremely uneven, unstable, loose, and porous.

The existing filter element usually has the following defects:

1) It is not suitable for filtering water with complex pollutants. The filter element carrier is single, mostly physical adsorption. The main filtering objects are macromolecular polymers or colloids and other fine particles, with less adsorption on metal ions.
2) Adsorption filtration is inefficient and the sewage discharge is large. The structure of the filter element is simple, and the high-pressure water chamber in the filter element is a simple hollow cylinder. The adsorption carrier near the high-pressure water chamber is preferentially blocked to prevent the continuous adsorption of the carrier near the surface of the filter element, and the pressure in the high-pressure water chamber rises at the same time. The pressure relief drain valve and backwash valve must be triggered frequently to backwash the filter element after pressure relief, dredge the adsorption carrier, and let the dredged sewage flow to the heavily polluted wastewater pool for centralized treatment.
3) Unable to recover precious metal ions. The adsorbed metal ions are not easily recovered and cannot be used for the recovery of precious metal ions.
4) The filter element cannot be desorbed and reused. The filter element is mostly disposable and treated as solid waste, which is a significant quantity of waste.

SUMMARY

A filter element includes a stirring device, a continuous adsorption carrier arranged around the stirring device, and a granular adsorption carrier filled between the continuous adsorption carrier and the stirring device. The stirring device stirs the granular adsorption carrier when filtering a liquid with the filter element.

BRIEF DESCRIPTION OF THE DRAWINGS

The invention will now be described by way of example with reference to the accompanying Figures, of which.

DETAILED DESCRIPTION OF THE EMBODIMENTS

Figure 1:
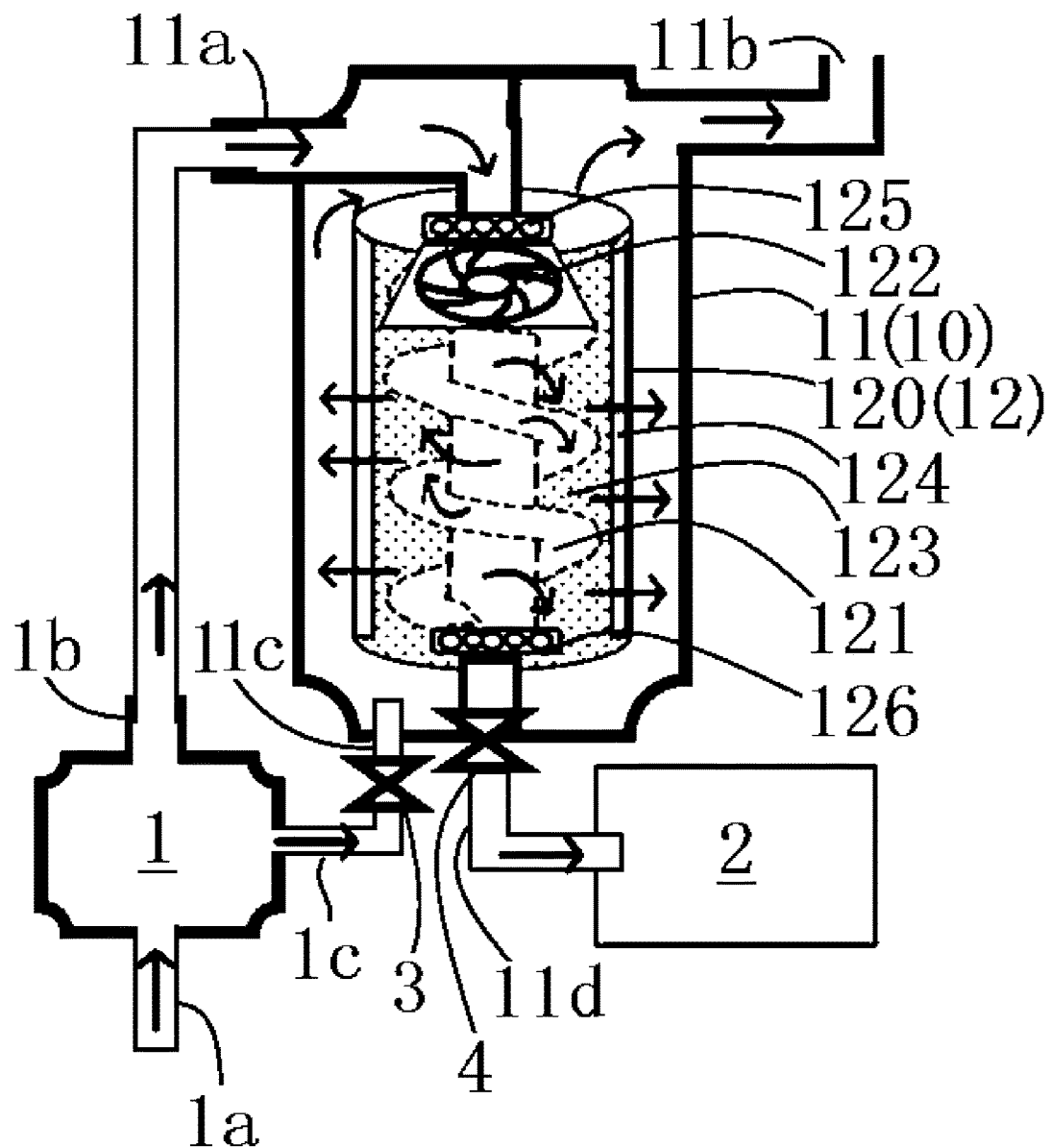
FIG. 1 is a schematic diagram of a filtration system according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

FIG. 1 shows a schematic diagram of a filtration system according to an exemplary embodiment of the present invention.

As shown in FIG. 1, in the illustrated embodiment, the filtration system includes a pump 1, a filter 10 and a liquid supply tank 5. The filter 10 includes a barrel 11 and a filter element 12 installed in the barrel 11. In order to facilitate replacement, the filter element 12 is detachably installed in the barrel 11.

As shown in FIG. 1, in the illustrated embodiment, the filter element 12 includes a stirring device 121 and 122, a continuous adsorption carrier 124, and a granular adsorption carrier 123. The continuous adsorption carrier 124 is arranged around the stirring device 121 and 122. The granular adsorption carrier 123 is filled between the continuous adsorption carrier 124 and the stirring device 121 and 122. When filtering the liquid, the stirring device 121 and 122 stirs the granular adsorption carrier 123. In this way, the adsorption rate of the granular adsorption carrier 123 can be improved and the blockage of the filter element 12 can be prevented.

As shown in FIG. 1, in an exemplary embodiment of the present invention, the stirring device 121 and 122 may include a stirring rod and a driving device. The driving device is connected with the stirring rod and is used to drive the stirring rod to rotate to stir the granular adsorption carrier 123 through the stirring rod. The driving device may be an electric driving device (E.G., a motor) or a liquid pressure driving device.

As shown in FIG. 1, in the illustrated embodiment, the stirring rod of the stirring device 121 and 122 is a worm 121, and the driving device of the stirring device 121 and 122 is a turbine 122. The worm 121 has a helical hollow inner cavity and micropores distributed on its surface and communicated with the hollow inner cavity. The turbine 122 is connected to the inlet of the worm 121 and is in fluid communication with the hollow inner cavity of the worm 121. The continuous adsorption carrier 124 is arranged around the worm 121 and the turbine 122. In the illustrated embodiment, the continuous adsorption carrier 124 is in a cylindrical shape. The granular adsorption carrier 123 is filled between the continuous adsorption carrier 124 and the worm 121.

As shown in FIG. 1, in the illustrated embodiment, the turbine 122 and the worm 121 are adapted to rotate under the action of the incoming liquid to stir the granular adsorption carrier 123 in a vortex manner. In the illustrated embodiment, since the liquid output by the pump 1 has a certain pressure, when the liquid enters the turbine 122, it will drive the turbine 122 to rotate and drive the worm 121 to rotate together through the turbine 122. In this way, the granular adsorption carrier 123 can be continuously stirred while filtering the liquid or backwashing the filter element 12, which improves the filtering effect and backwashing effect of the filter element 12 and prevents the filter element 12 from being blocked.

As shown in FIG. 1, in the illustrated embodiment, the barrel 11 of the filter 10 has a liquid inlet pipe 11*a* and a liquid outlet pipe 11*b*. The liquid to be filtered flows into the turbine 122 and worm 121 of the filter element 12 through the liquid inlet pipe 11*a*, and the filtered liquid flows out through the liquid outlet pipe 11*b*. When filtering the liquid, the turbine 122 and the worm 121 rotate under the action of the liquid flowing through the liquid inlet pipe 11*a* to stir the granular adsorption carrier 123.

As shown in FIG. 1, in the illustrated embodiment, when filtering the liquid, the liquid exudes from the micropores of the worm 121 and flows through the granular adsorption carrier 123 and the continuous adsorption carrier 124 to filter the liquid through the granular adsorption carrier 123 and the continuous adsorption carrier 124. The filtered liquid seeps from the continuous adsorption carrier 124 into the inner cavity of the barrel 11, and finally flows out of the liquid outlet pipe 11*b* of the barrel 11.

As shown in FIG. 1, in the illustrated embodiment, the barrel 11 also has a backwash pipe 11*c* and a drain pipe 11*d*. The backwash pipe 11*c* communicates with the inner cavity of the barrel 11. The drain pipe 11*d* is connected with the outlet of the worm 121. A backwash valve 3 is installed on the backwash pipe 11*c*, and a drain valve 4 is installed on the drain pipe 11*d*. Backwash valve 3 and drain valve 4 are closed when filter 10 filters liquid.

As shown in FIG. 1, in the illustrated embodiment, when the granular adsorption carrier 123 and the continuous adsorption carrier 124 in the filter element 12 are saturated or blocked, the liquid pressure in the worm 121 will rise. When the liquid pressure in the worm 121 rises to a predetermined pressure, the backwash valve 3 and the drain valve 4 will be triggered to open. At this time, the liquid will enter the barrel 11 through the backwash pipe 11*c*. The liquid entering the barrel 11 through the backwashing pipe 11*c* will flow reversely from the outside of the filter element 12 into the worm 121, and the liquid flowing reversely into the worm 121 will be discharged through the drain pipe 11*d*, so as to realize the backwashing of the filter element 12.

As shown in FIG. 1, in the illustrated embodiment, when backwashing the filter element 12, the turbine 122 and the worm 121 rotate under the action of the liquid flowing through the liquid inlet pipe 11*a* to stir the granular adsorption carrier 123. In this way, the backwashing effect of the granular adsorption carrier 123 and the continuous adsorption carrier 124 can be improved and the service life of the filter element 12 can be prolonged.

As shown in FIG. 1, in the illustrated embodiment, the inlet of the turbine 122 is rotatably installed on the liquid inlet pipe 11*a* of the barrel 11 through a first bearing 125 and is in fluid communication with the liquid inlet pipe 11*a*. The outlet of the worm 121 is rotatably mounted on the drain pipe 11*d* of the barrel 11 through a second bearing 126 and is in fluid communication with the drain pipe 11*d*.

As shown in FIG. 1, in the illustrated embodiment, the filter element 12 also includes a cylindrical outer frame 120. The continuous adsorption carrier 124 and the granular adsorption carrier 123 are accommodated and supported in the outer frame 120. In an exemplary embodiment of the present invention, both ends of the outer frame 120 are detachably fixed to the liquid inlet pipe 11*a* and drain pipe 11*d* of the barrel 11, respectively.

As shown in FIG. 1, in the illustrated embodiment, in order to improve the rolling performance of the granular adsorption carrier 123 when stirred, the granular adsorption carrier 123 may be in the shape of a sphere with a smooth surface. However, the present invention is not limited to this, and the granular adsorption carrier 123 may also have other suitable shapes.

As shown in FIG. 1, in the illustrated embodiment, the pump 1 pumps the liquid in the liquid supply tank 5 to the filter 10. The pump 1 has an inlet 1*a* connected to the liquid supply tank 5, a first outlet 1*b* connected to the liquid inlet pipe 11*a* of the filter 10, and a second outlet 1*c* connected to the backwash pipe 11*c* of the filter 10.

As shown in FIG. 1, in the illustrated embodiment, when the liquid is filtered by the filter 10, the liquid pumped from the first outlet 1*b* of the pump 1 flows into the turbine 122 and worm 121 of the filter element 12 through the liquid inlet pipe 11*a* of the filter 10.

As shown in FIG. 1, in the illustrated embodiment, the filtration system also includes a waste water tank 2. The drain pipe 11*d* of the filter 10 is connected to the waste water tank 2. When the filter element 12 is backwashed, the liquid in the hollow inner cavity of the worm 121 is discharged to the waste water tank 2 through the drain pipe 11d.

As shown in FIG. 1, in the illustrated embodiment, when backwashing the filter element 12, the liquid pumped from the first outlet 1b of the pump 1 flows into the turbine 122 and worm 121 of the filter element 12 through the inlet pipe 11a of the filter 10, and the liquid pumped from the second outlet 1c of the pump 1 flows into the barrel 11 of the filter 10 through the backwash pipe 11c of the filter 10.

Figure 2:
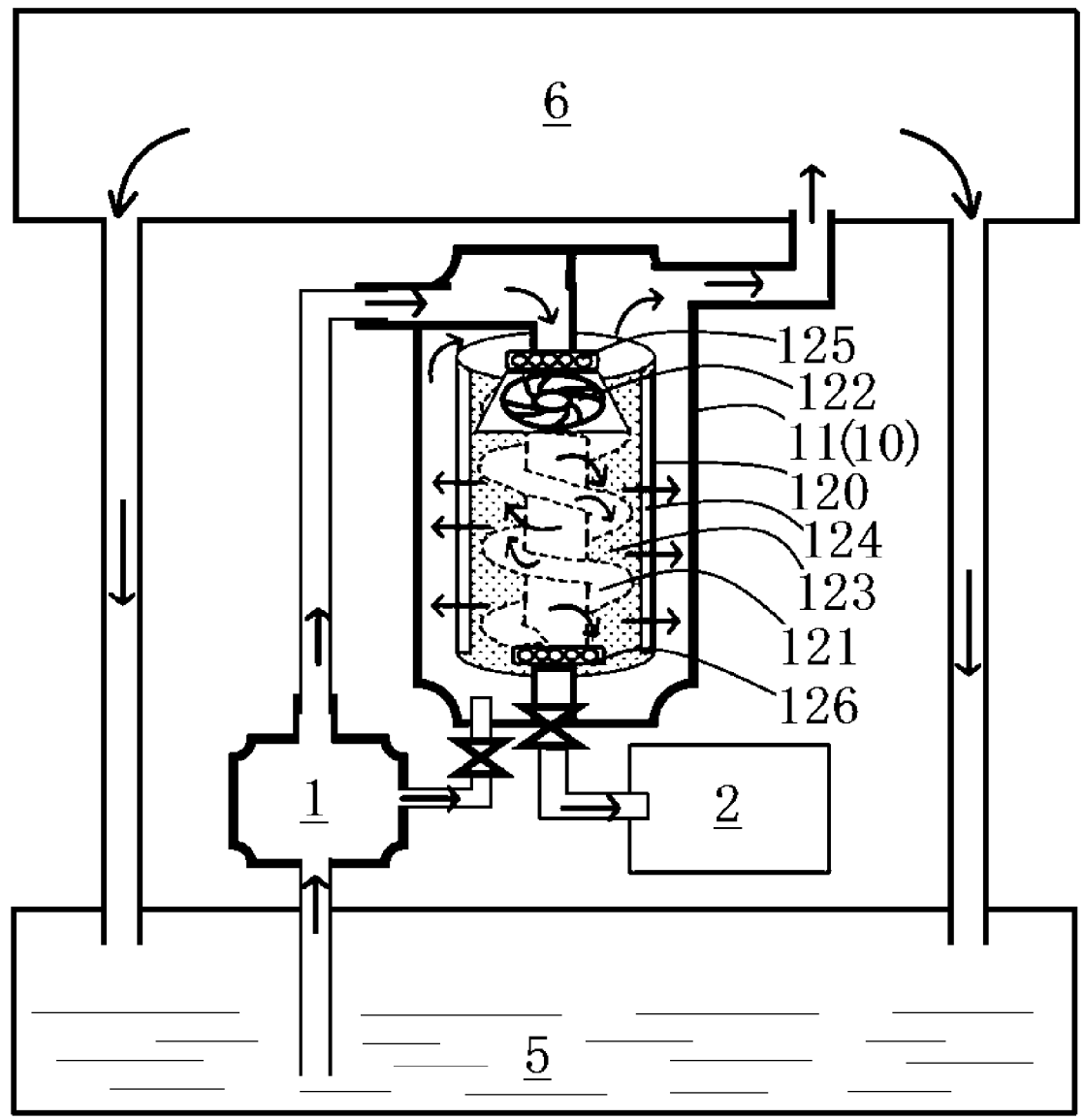
FIG. 2 is a schematic diagram of a cleaning system according to an exemplary embodiment of the present invention.

FIG. 2 shows a schematic diagram of a cleaning system according to an exemplary embodiment of the present invention.

As shown in FIG. 2, in the illustrated embodiment, the cleaning system mainly includes the filtration system of FIG. 1 and a cleaning tank 6. The cleaning tank 6 has an inlet communicated with the liquid outlet pipe 11b of the filter 10 of the filtration system. The filtered liquid flows into the cleaning tank 6 through the outlet pipe 11b of the filter 10 to clean the workpieces in the cleaning tank. In an exemplary embodiment of the present invention, the workpieces to be cleaned may be electroplated workpieces.

As shown in FIG. 2, in the illustrated embodiment, the outlet of the cleaning tank 6 is connected with the liquid supply tank 5 to allow the cleaned liquid to return to the liquid supply tank 5 and be filtered again by the filter 10. In this way, a circulating cleaning system is formed.

As shown in FIG. 1 and FIG. 2, in an exemplary embodiment of the present invention, starting from the purification of electroplating water washing water, a new type of filter element is developed. Its outer layer can be filled with resin film, porous melt blown resin, porous ceramic sintering structure, wire wound braid and other integral continuous structures, and the middle layer can be filled with one or multiple kinds of resin particles or random mixing of activated carbon particles. At the same time, it has physical adsorption and chemical adsorption. The inner structure is no longer the traditional hollow cylindrical structure, but the turbine and hollow vortex rod. As the water inlet channel, it also uses the water power of the water to drive the turbine and hollow vortex rod to rotate, generate vortex, stir resin and other particles, improve the adsorption rate of resin and prevent blockage. At the same time, vortex stirring can also be used to strengthen the backwashing of the adsorption carrier and increase the reuse times of the filter element. The filter element frame can be reused until it is physically damaged, and only a new adsorption carrier such as resin film or resin particles can be replaced. The selected adsorption carrier can be selectively adsorbed according to the pollution components of the sewage. For example, polypropylene resin can be used to adsorb macromolecular groups such as engine oil or inorganic precipitation, and activated carbon can be used to adsorb heavy metal ions and pigments. When the gold, silver and other precious metal ions are saturated with thiourea resin, the filter element can be taken out for desorption and recovery of precious metals. The vortex stirring can make the desorption more sufficient. The appearance design of the new filter element can match the filter barrel of most filters on the market without replacing the filter barrel of the filter.

As shown in FIG. 1 and FIG. 2, in the illustrated embodiment, the new filter element 12 is installed into the filter barrel 11, and the bearings 125, 126 at both ends of the filter element 12 are respectively fixed with the ferrules of the liquid inlet pipe 11a and the pressure relief and drain pipe 11d of the filter barrel 11. Here, the bearing 125, 126 is made of wear-resistant materials such as ceramic or die steel, which is not a disposable product. When replacing the filter element 12, it can be replaced with a new filter element for repeated use.

As shown in FIG. 1 and FIG. 2, in the illustrated embodiment, the liquid is pumped out by the water pump 1 under high pressure and enters the turbine 122 through the liquid inlet pipe 11a. The turbine 122 drives the worm 121 to rotate to stir granular adsorption carrier 123. Here, the turbine 122 and the worm 121 are made of plastic or metal, 3D printed or machined. The porous carrier 121 and the porous carrier 124 are continuously adsorbed to absorb the liquid. The granular adsorption carrier 123 here is a random or proportional mixture of one or multiple kinds of resin particles or activated carbon particles, with physical adsorption and chemical adsorption at the same time. The spherical shape may be used for smooth rolling.

As shown in FIG. 1 and FIG. 2, in the illustrated embodiment, the liquid filtered by the granular adsorption carrier 123 reaches the continuous adsorption carrier 124, flows into the filter barrel 11 after multiple filtration, and flows out of the liquid outlet pipe 11b. The continuous adsorption carrier 124 can be an integral continuous structure such as resin film, porous melt blown resin, porous ceramic sintering structure, wire wound braid, etc.

As shown in FIG. 1 and FIG. 2, in the illustrated embodiment, when the continuous adsorption carrier 124 on the surface is saturated and blocked, the liquid pressure in the cavity of worm 121 rises, triggering the opening of pressure relief drain valve 4 and backwash valve 3, backwashing filter element 12 after pressure relief, dredging granular adsorption carrier 123 and continuous adsorption carrier 124, and allowing the dredged sewage to flow to heavily polluted wastewater tank 2 for centralized treatment. The continuous adsorption carrier 124 is mainly dredged here. The granular adsorption carrier 123 does not need to be dredged, especially the chemical adsorption must be desorbed with special liquid medicine. Therefore, there is no need to worry that the backwashing will desorb precious metal ions, and the backwashing will only continue to adsorb precious and heavy metal ions.

As shown in FIG. 1 and FIG. 2, in the illustrated embodiment, when the granular adsorption carrier 123 is saturated, it can be taken out, desorbed by the off-line recovery system, and the continuous adsorption carrier 124 can be replaced. After desorbing, the granular adsorption carrier 123 can be reused for 3-5 times until the adsorption effect is significantly reduced.

As shown in FIG. 1 and FIG. 2, in the illustrated embodiment, the filter element of the present invention is suitable for filtering the liquid with complex pollutants. It can fill a variety of filter element carriers according to the type of waste liquid, and has physical adsorption and chemical adsorption at the same time. The filter element of the present invention has high adsorption and filtration efficiency and small drain discharge. The hydraulic pressure drives the novel turbine and hollow vortex rod to rotate, producing vortex to stir resin and other particles, so as to improve the adsorption rate of resin and prevent blockage. The filter element of the present invention can recover precious metal ions, can selectively fill resin particles for chemical adsorption of precious metals such as gold and silver, has high adsorption rate, will not desorb during backwashing, and has high desorption recovery rate in the later stage. Moreover, the filter element of the present invention can be desorbed and reused.

In conclusion, the filter element 12 of the present invention mainly has at least one of the following advantages:

1) Suitable for filtering liquids with complex pollutants: various filter element carriers can be filled according to the type of waste liquid. The outer layer can be filled with integral continuous structures such as resin film, porous melt blown resin, porous ceramic sintering structure and wire wound braid. The middle layer can be filled with one or multiple types of resin particles or activated carbon particles, with physical adsorption and chemical adsorption at the same time.

2) High efficiency of adsorption filtration and the discharge is small: the filter element has a smart structure. The high-pressure liquid cavity in the filter element is a turbine and a hollow vortex rod. As the water inlet channel, it also uses the water power of the water inlet to drive the turbine and the hollow vortex rod to rotate to produce vortex to stir resin and other particles, so as to improve the adsorption rate and anti blocking of the resin. At the same time, vortex stirring can also be used to strengthen the backwashing of the adsorption carrier, and increase the reuse times of filter element.

3) It can recover precious metal ions: it can selectively fill resin particles for chemical adsorption of precious metals such as gold and silver. For example, in this embodiment, the polyester based thiourea resin is used. The molecular structure of thiourea contains N and S coordination atoms, which has good selective complexation adsorption for gold and silver ions (the adsorption saturation of gold and silver ions can reach 5 mmol/g), while the static resin is difficult to reach the adsorption saturation. Vortex stirring not only promotes the adsorption saturation, In the later desorption process, gold and silver ions can be fully recovered.

4) The filter element can be desorbed and reused: the backwashing and reuse is simple, and the vortex stirring can also be used to strengthen the backwashing of the adsorption carrier and increase the reuse times of the filter element. The filter element frame can be reused until it is physically damaged, and only a new adsorption carrier such as resin film or resin particles can be replaced.

5) Can match the filter barrel of most existing filters: the appearance design of the new filter element can match the filter barrel of most filters on the market without replacing the filter barrel of the filter.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A filter element, comprising:
   a stirring device;
   a continuous adsorption carrier arranged around the stirring device; and
   a granular adsorption carrier filled between the continuous adsorption carrier and the stirring device, the stirring device stirs the granular adsorption carrier when filtering a liquid with the filter element, the stirring device includes a worm and a turbine connected to an inlet of the worm, the worm has a helical hollow inner cavity and a plurality of micropores distributed on a surface and communicated with the helical hollow inner cavity.

2. The filter element of claim 1, wherein the worm is a stirring rod and the turbine is a driving device connected with the stirring rod, the driving device drives the stirring rod to rotate and stir the granular adsorbing carrier.

3. The filter element of claim 2, wherein the driving device is an electric driving device or a liquid pressure driving device.

4. The filter element of claim 1, wherein:
   the turbine is in fluid communication with the helical hollow inner cavity, the continuous adsorption carrier is arranged around the worm and the turbine, the turbine and the worm are driven to rotate under an impact of the liquid flowing into the turbine to stir the granular adsorption carrier in a vortex manner.

5. The filter element of claim 1, wherein the continuous adsorption carrier is a resin film, a porous melt blown resin, a porous ceramic sintering structure, or a wire wound braid.

6. The filter element of claim 1, wherein the granular adsorption carrier is a plurality of resin particles, a plurality of activated carbon particles, or mixtures thereof.

7. The filter element of claim 1, wherein the granular adsorption carrier is in a shape of a sphere with a smooth surface.

8. A filter, comprising:
   a barrel having a liquid inlet pipe and a liquid outlet pipe; and
   the filter element of claim 1 installed in the barrel, the liquid prior to filtering flows into the filter element through the liquid inlet pipe and flows out of the liquid outlet pipe after filtering.

9. The filter of claim 8, wherein:
   the turbine is in fluid communication with the helical hollow inner cavity, the continuous adsorption carrier is arranged around the worm and the turbine, the turbine and the worm are driven to rotate under an impact of the liquid flowing into the turbine to stir the granular adsorption carrier in a vortex manner.

10. The filter of claim 9, wherein, when filtering the liquid, the liquid exudes from the micropores of the worm and flows through the granular adsorption carrier and the continuous adsorption carrier to filter the liquid.

11. The filter of claim 9, wherein the barrel has a backwash pipe and a drain pipe, the backwash pipe communicates with an inner cavity of the barrel, and the drain pipe communicates with an outlet of the worm, a backwash valve and a drain valve are respectively installed on the backwash pipe and the drain pipe, the backwash valve and the drain valve are closed when the filter filters the liquid.

12. The filter of claim 11, wherein, when a liquid pressure in the worm rises to a predetermined pressure, the backwash valve and the drain valve are opened, the liquid entering the barrel through the backwash pipe flows reversely into the worm from outside of the filter element, and the liquid flowing reversely into the worm is discharged through the drain pipe, so as to backwash the filter element.

13. The filter of claim 12, wherein, when backwashing the filter element, the turbine and worm are driven to rotate under the impact of the liquid flowing into the turbine through the liquid inlet pipe to stir the granular adsorption carrier in the vortex manner.

14. The filter of claim 11, wherein an inlet of the turbine is rotatably installed on the liquid inlet pipe of the barrel through a first bearing and is in fluid communication with the liquid inlet pipe, the outlet of the worm is rotatably installed on the drain pipe of the barrel through a second bearing and is in fluid communication with the drain pipe.

15. The filter of claim 11, wherein the filter element has a cylindrical outer frame, the continuous adsorption carrier and the granular adsorption carrier are accommodated and supported in the cylindrical outer frame, and both ends of the cylindrical outer frame are detachably fixed to the liquid inlet pipe and the drain pipe of the barrel, respectively.

16. A filtration system, comprising:
the filter according to claim 11;
a liquid supply tank for supplying liquid to the filter; and
a pump having an inlet connected to the liquid supply tank, a first outlet connected to the liquid inlet pipe, and a second outlet connected to the backwash pipe.

17. The filtration system of claim 16, wherein, when filtering the liquid with the filter, the liquid pumped from the first outlet of the pump flows into the turbine and worm through the liquid inlet pipe.

18. The filtration system of claim 16, further comprising a waste water tank to which the drain pipe is connected and, when backwashing the filter element, the liquid in the helical hollow inner cavity of the worm is discharged into the waste water tank through the drain pipe.

19. The filtration system of claim 18, wherein, when backwashing the filter element, the liquid pumped from the first outlet flows into the turbine and worm through the liquid inlet pipe, and the liquid pumped from the second outlet of the pump flows into the barrel through the backwash pipe.

20. A cleaning system, comprising:
the filtration system according to claim 16; and
a cleaning tank having an inlet communicating with the liquid outlet pipe, filtered liquid flows into the cleaning tank through the outlet pipe to clean a plurality of workpieces in the cleaning tank, an outlet of the cleaning tank communicates with the liquid supply tank to allow cleaned liquid to return to the liquid supply tank and be filtered again by the filter.

* * * * *